United States Patent [19]

Wicki

[11] 4,374,064
[45] Feb. 15, 1983

[54] METAL COMPLEXES OF DISAZO COMPOUNDS HAVING A 5-AMINO OR HYDROXY-3-CARBOXY OR METHYL-1-SUBSTITUTED PHENYLPYRAZOLE COUPLING COMPONENT RADICAL

[75] Inventor: Heinz Wicki, Basel, Switzerland

[73] Assignee: Sandoz Ltd., Basel, Switzerland

[21] Appl. No.: 144,380

[22] Filed: Apr. 28, 1980

[30] Foreign Application Priority Data

May 2, 1979 [CH] Switzerland .................. 4117/79

[51] Int. Cl.³ .................. C09B 45/26; C09B 45/28; C09B 45/30; C09B 45/32
[52] U.S. Cl. .................. 260/147; 8/437; 8/506; 8/673; 8/674; 8/681; 260/145 B; 260/145 C; 260/154; 260/155; 260/156; 260/160; 428/90
[58] Field of Search .................. 260/147, 145 B, 145 C

[56] References Cited

U.S. PATENT DOCUMENTS

| | | | |
|---|---|---|---|
| 2,813,856 | 11/1957 | Steinemann et al. | 260/147 X |
| 3,252,963 | 5/1966 | Blackhall et al. | 260/147 |
| 4,123,428 | 10/1978 | Holliger et al. | 260/145 B X |

FOREIGN PATENT DOCUMENTS

| | | | |
|---|---|---|---|
| 611511 | 9/1932 | Fed. Rep. of Germany | 260/162 |
| 2416342 | 10/1974 | Fed. Rep. of Germany | 260/145 B |
| 2634497 | 3/1978 | Fed. Rep. of Germany | 260/147 |
| 1466877 | 1/1967 | France | 260/147 |
| 349724 | 12/1960 | Switzerland | 260/145 C |
| 796397 | 6/1958 | United Kingdom | 260/145 C |
| 1119274 | 7/1968 | United Kingdom | 260/147 |
| 1137351 | 12/1968 | United Kingdom | 260/147 |
| 2399296 | 7/1975 | United Kingdom | 260/147 |

Primary Examiner—John Doll

Attorney, Agent, or Firm—Gerald D. Sharkin; Richard E. Vila; Melvyn M. Kassenoff

[57] ABSTRACT

Compounds of the formula

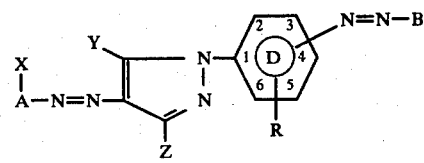

in which
- A—X— is the radical of a diazo component,
- X— is ortho to the azo group and is a metallizable substituent or a substituent convertible to a metallizable group,
- Y is —OH or —NH₂,
- Z is methyl or carboxy,
- R is hydrogen, halogen, methyl or sulpho, and
- B is the radical of a coupling component of the heterocyclic, acyclic active methylene or monocyclic benzene series, which coupling component of the monocyclic benzene series contains an amino and/or hydroxy group which groups may be alkylated or acylated, and
- —N=N—B is bound to the 3- or 4-position of ring D, which compounds contain at least one water-solubilizing group, and metal complexes thereof, with the proviso that when the compounds are unmetallized, B is other than a
- monocyclic benzene coupling component radical. The metal complexes are useful as dyes for the dyeing and printing of anionic dyeable.

54 Claims, No Drawings

METAL COMPLEXES OF DISAZO COMPOUNDS HAVING A 5-AMINO OR HYDROXY-3-CARBOXY OR METHYL-1- SUBSTITUTED PHENYLPYRAZOLE COUPLING COMPONENT RADICAL

The present invention relates to disazo compounds and metal complexes thereof.

More particularly the present invention provides compounds of formula I

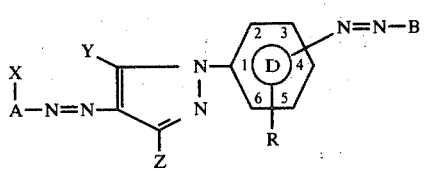

in which
A—X— is the radical of a diazo component,
X— is ortho to the azo group and is a metallizable substituent or a substituent convertible to a metallizable group,
Y is —OH or —NH$_2$,
Z is methyl or carboxy,
R is hydrogen, halogen, methyl or sulpho,
and
B is the radical of a coupling component of the heterocyclic, non-cyclic active methylene or monocyclic benzene series, which coupling component of the monocyclic benzene series contains an amino and/or hydroxy group optionally alkylated or acylated, and
the radical —N=N—B is bound to the 3- or 4-position of ring D,
which compounds contain at least one water-solubilising group, and metal complexes thereof, with the proviso that when the compounds of formula I are unmetallized, B is other than a monocyclic benzene coupling component radical.

A suitable example of a substituent convertible into a metallizable substituent is methoxy. The methoxy group may be converted to a hydroxy group either before or during metallization.

The preferred metallizable substituents as X are —OH, —NH$_2$ and —COOH, more preferably —OH and —COOH, especially —OH.

The diazo component radicals as —A—X may be any of those conventional in anionic dyestuffs, advantageously those which contain at maximum two condensed benzene rings, with radicals of the benzene and naphthalene series being preferred. The preferred naphthalene radicals are those derived from 1-amino-2-hydroxy-4-sulphonaphthalene and 1-amino-2-hydroxy-4-sulpho-6-nitronaphthalene. The preferred radicals of the benzene series are those derived from ortho-aminohydroxybenzenes and ortho-aminocarboxybenzenes in which the benzene nucleus is optionally substituted by up to two substituents selected from the group consisting of halogen, C$_{1-4}$alkyl, C$_{1-4}$alkoxy, nitro, carboxy, acetylamino, sulpho and —SO$_2$NR$_1$R$_2$, with the proviso that a maximum of one substituent is selected from the group consisting of sulpho, —SO$_2$NR$_1$R$_2$ and acetylamino. Preferably in such substituted aminohydroxybenzenes or aminocarboxybenzenes a maximum of one substituent is selected from the group consisting of carboxy, alkyl and alkoxy, and such benzenes bear a maximum of one halogen atom. More preferably when the group —SO$_2$NR$_1$R$_2$ is present, the same ring bears no further substituent.

R$_1$ is hydrogen or C$_{1-4}$alkyl.
R$_2$ is hydrogen, C$_{1-4}$alkyl or

in which
R$_3$ is hydrogen, halogen, C$_{1-4}$alkyl, C$_{1-4}$alkoxy or carboxy. Of the alkyl or alkoxy groups or moieties in the hydroxybenzenes or carboxybenzenes as —A—X, the lower ones are preferred, especially methyl and methoxy.

By halogen is meant chlorine, bromine, iodine and fluorine. The preferred halogens are chlorine and bromine, especially chlorine.

When R$_2$ is

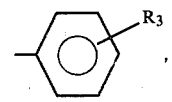

R$_1$ is preferably hydrogen. R$_3$ is preferably R$_3'$, where R$_3'$ is hydrogen, chlorine, methyl, methoxy or carboxy, more preferably hydrogen or carboxy, especially hydrogen.

R$_1$ is preferably R$_1'$, where R$_1'$ is hydrogen or methyl. R$_2$ is preferably R$_2'$, where R$_2'$ is hydrogen, methyl or

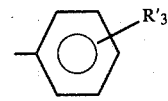

Most preferably R$_1$ is hydrogen and R$_2$ is R$_2''$, where R$_2''$ is methyl, phenyl or carboxyphenyl, especially phenyl.

Preferably —A—X is —A'—X, where —A'—X is a group of formula (a$_1$) or (a$_2$)

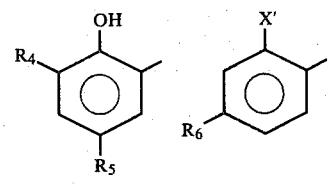

in which
R$_4$ is hydrogen, carboxy, sulpho or nitro,
R$_5$ is hydrogen, chlorine, nitro, sulpho or —SO$_2$NR$_1$R$_2$, with the proviso that at most one of R$_4$ and R$_5$ is hydrogen, and when R$_5$ is sulpho or —SO$_2$NR$_1$R$_2$, R$_4$ is other than sulpho,
R$_6$ is hydrogen, nitro, —SO$_2$NR$_1$R$_2$, sulpho or acetylamino, and
X' is hydroxy or carboxy.

When $R_4$ is carboxy, $R_5$ is preferably hydrogen or sulpho, and when one of $R_4$ and $R_5$ is nitro, the other is preferably sulpho or nitro. $X'$ is preferably hydroxy. $R_6$ is preferably hydrogen, nitro or $-SO_2NR_1R_2$.

When the diazo component radical contains a group convertible to a metallizable group, suitable diazo component radicals are those derived from ortho-methoxyaniline and ortho-methoxy-nitroaniline.

Of the groups of formulae $(a_1)$ and $(a_2)$, those of formula $(a_1)$ are preferred. Most preferred groups of formula $(a_1)$ are those of formulae $(a_1')$ and $(a_1'')$

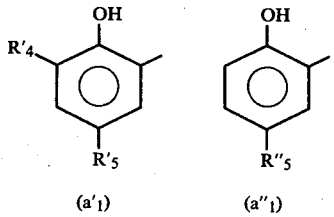

(a'$_1$)      (a''$_1$)

in which one of $R_4'$ and $R_5'$ is nitro and the other is nitro or sulpho, and $R_5''$ is nitro or $-SO_2NR_1R_2$.

The groups of formula $(a_1'')$ are preferred, particularly those where $R_5''$ is $-SO_2NR_1R_2$, preferably $-SO_2NR_1'R_2'$, with those where $R_5''$ is $-SO_2NHR_2''$ being most preferred.

Y is preferably hydroxy.

Z is preferably methyl.

When R signifies a sulpho group, it is preferably in the 5-position of the ring D while group $-N=N-B$ is preferably in the 3-position. When R is methyl, it is preferably in the 3-position whilst the $-N=N-B$ group is in the 4-position. Any halogen as R is preferably chlorine. Most preferably R is hydrogen and the group $-N=N-B$ is most preferably in the 4-position.

When B is the radical of a coupling component of the heterocyclic series such coupling component advantageously contains at most three aromatic rings, preferably at most two aromatic rings, the heterocyclic ring on which coupling occurs being counted as an aromatic ring. The non-cyclic active methylene coupling component radicals as B may contain an aromatic ring in a position other than that where coupling occurs. By coupling component radical of the monocyclic benzene series is meant components which, when coupling occurs, contain only one ring. However, as stated above any amino and/or hydroxy group thereon may be acylated or alkylated, which acylation may be, for example, by an aromatic carboxylic or sulphonic acid, after coupling has taken place. Preferred such acids are benzoic acid, benzenesulphonic acid and toluenesulphonic acid, especially the latter two, with toluenesulphonic acid being most preferred. Further, any hydroxy or amino group may be alkylated, preferably with an alkylating agent containing 1 to 4 carbon atoms.

Suitable radicals of heterocyclic coupling components are unsaturated, nitrogen-containing component radicals which contain an amino or, preferably, hydroxy group as coupling activating group. Preferred radicals of coupling components of the heterocyclic series are those derived from coupling components of the pyrazolone, aminopyrazole, pyridone, pyrimidone and oxyquinoline series, especially those of formulae $(b_1)$ to $(b_4)$

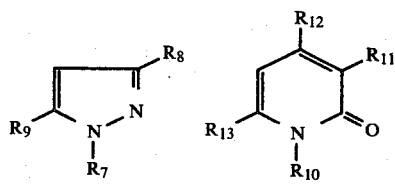

(b$_1$)      (b$_2$)

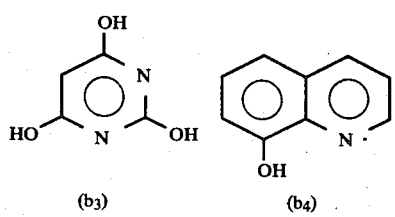

(b$_3$)      (b$_4$)

in which $R_7$ is hydrogen or $(c_1)$ or $(c_2)$

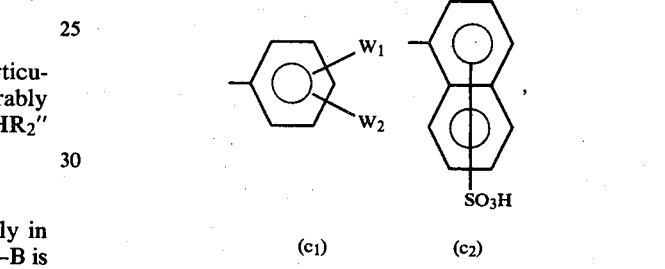

(c$_1$)      (c$_2$)

wherein $W_1$ is hydrogen, chlorine, methyl, methoxy, cyano, nitro, carboxy, $-SO_2NW_3W_4$ or sulpho, $W_2$ is hydrogen, chloro, methyl, methoxy or carboxy, each of $W_3$ and $W_4$, independently, is hydrogen, $C_{1-4}$alkyl or 2-, 3- or 4-hydroxy- or $C_{1-4}$alkoxy-substituted $C_{2-4}$alkyl, $R_8$ is $C_{1-4}$alkyl, phenyl, carboxy or $-CONW_3W_4$, $R_9$ is $-OH$ or $-NH_2$, $R_{10}$ is hydrogen, $-NH_2$, phenylamino, $(c_1)$, $(c_2)$, $C_{1-8}$alkyl, $C_{6-9}$cycloalkyl, carboxy-$C_{1-4}$-alkyl or $C_{2-4}$alkyl substituted by hydroxy, methoxy, ethoxy or sulpho, with the proviso that any hydroxy or alkoxy substituent is in the 2-, 3- or 4-position, $R_{11}$ is hydrogen, carboxy, sulpho, $-CO-CH_3$ or $-CN$, $R_{12}$ is hydrogen, hydroxy, methyl, carboxy, phenyl or sulpho-methylene, and $R_{13}$ is hydrogen, hydroxyl or methyl, with the proviso that at least one of $R_{12}$ and $R_{13}$ is hydroxy.

Preferred radicals of coupling components of the non-cyclic active methylene series are those derived from coupling components of the acetic acid ester or acetic acid amide series, especially those of formula (b$_5$)

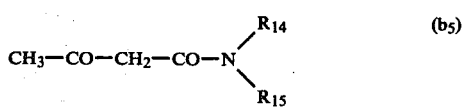

(b$_5$)

in which $R_{14}$ is hydrogen or $C_{1-4}$alkyl, and $R_{15}$ is $C_{1-8}$alkyl, $C_{6-9}$cycloalkyl or a group of formula ($c_1$) or ($c_2$).

Preferred coupling components of the monocyclic benzene series are those of the phenol series, especially those of formula ($b_6$),

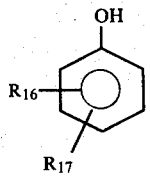
(b<sub>6</sub>)

in which $R_{16}$ is hydrogen, $C_{1-4}$alkyl, $C_{1-4}$alkoxy or halogen, and $R_{17}$ is hydrogen or $C_{1-4}$alkyl.

When coupling has taken place it is advantageous to etherify or acylate the phenolic —OH group; thus in the groups ($b_6$), in place of the —OH group the following groups are advantageously present: —OC$_{1-4}$alkyl, $C_6H_5SO_2$—O— and tolyl—$SO_2$—O—.

Any alkyl or alkoxy substituents on aromatic carbocylic groups are preferably the lower ones, especially ethyl, methyl, ethoxy and methoxy, unless otherwise stated.

Any cycloalkyl groups in the molecule are preferably cyclohexyl. Such cyclohexyl group may be alkyl substituted and when alkyl substituted the preferred substituents are up to three methyl groups. Most preferably any cycloalkyl is unsubstituted cyclohexyl.

$R_7$ is preferably ($c_1$).

$W_2$ is preferably hydrogen.

Each of $W_3$ and $W_4$, independently, is preferably hydrogen or methyl.

$R_8$ is preferably methyl or carboxy, especially methyl.

$R_9$ is preferably hydroxy.

$R_{10}$ is preferably hydrogen, $C_{1-4}$alkyl, cyclohexyl or ($c_1$), especially hydrogen.

$R_{11}$ is preferably cyano.

$R_{12}$ is preferably methyl.

$R_{13}$ is preferably hydroxy.

$R_{14}$ is preferably hydrogen.

$R_{15}$ is preferably ($c_1$).

$R_{16}$ is preferably hydrogen, methyl, methoxy or chlorine, especially methoxy.

$R_{17}$ is preferably hydrogen or methyl, especially hydrogen.

In the group ($c_1$) as $R_7$ or $R_{10}$, $W_1$ is preferably hydrogen or sulpho, as $R_{15}$, $W_1$ is preferably hydrogen, methyl or methoxy, especially hydrogen.

The preferred radicals of coupling components are those of the heterocyclic and non-cyclic active methylene components.

Of the components ($b_1$) to ($b_4$), the components ($b_1$), ($b_2$) and ($b_4$) are preferred, especially ($b_1$) and ($b_2$), with ($b_1$) being the most preferred.

($b_1$) is preferably ($b_1'$)

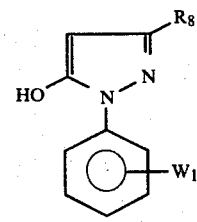
(b'<sub>1</sub>)

in which $W_1$ and $R_8$ are as defined above. More preferred ($b_1'$) groups are those where $W_1$ is sulpho and $R_8$ is methyl or carboxy, especially methyl.

($b_2$) is preferably ($b_2'$),

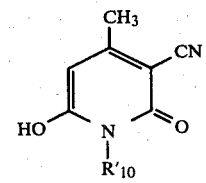
(b'<sub>2</sub>)

in which $R_{10}'$ is hydrogen, $C_{1-4}$alkyl, cyclohexyl or ($c_1$) in which $W_2$ is hydrogen, especially those where $W_1$ is hydrogen or sulpho.

In ($b_2$), $R_{10}'$ is preferably hydrogen.

The complexes according to the present invention are 1:1 or 1:2 metal complexes. The 1:2 metal complexes may be complexes of compounds of formula I and a further metallizable compound. However, the preferred 1:2 complexes are those in which both complexants are of formula I, which complexes may be symmetrical or asymmetrical.

The metals in the complexes may be any of those common for 1:1 or 1:2 metal complexe dyestuffs, especially copper, nickel, chromium, cobalt and iron, with copper, chromium and especially cobalt being preferred.

Preferred metal-free compounds and metal complexes of this invention are those in which the disazo compound of formula I contains at least one sulfo, carboxy or sulfonamido group. Preferred metal-free compounds and metal complexes of this group are (i) those in which A—X— is derived from 1-amino-2-hydroxy-4-sulfonaphthalene, 1-amino-2-hydroxy-6-nitro-4-sulfonaphthalene or an ortho-aminohydroxybenzene or ortho-aminocarboxybenzene in which the benzene ring is further unsubstituted or further substituted by one or two substituents selected from halogen, $C_{1-4}$alkyl, $C_{1-4}$alkoxy, nitro, carboxy, acetamido, sulfo and —$SO_2NR_1R_2$, with the proviso that not more than one substituent is selected from acetamido, sulfo and —$SO_2NR_1R_2$, (ii) those wherein A—X— is a group of formula ($a_1$) or ($a_2$), (iii) those of (i) wherein B is derived from a coupling component of formula ($b_1$), ($b_2$), ($b_3$), ($b_4$), ($b_5$), ($b_6$) or ($b_6$) in which the hydroxy group is replaced by $C_{1-4}$alkoxy, phenylsulfonyloxy or tolylsulfonyloxy, (iv) those of (i) wherein B is derived from a coupling component of formula ($b_1$), ($b_2$), ($b_3$), ($b_4$) or ($b_5$), (v) those of (iv) wherein A—X— is a group of formula ($a_1$), (vi) those of (iv) wherein A—X— is a group of formula ($a_1'$) or ($a_1''$) and (vii) those of (iv) wherein B is derived from a coupling component of formula ($b_1$) or ($b_2$), preferably ($b_1$) and especially ($b_1'$).

The preferred 1:1 metal complexes are of formula $I_a$,

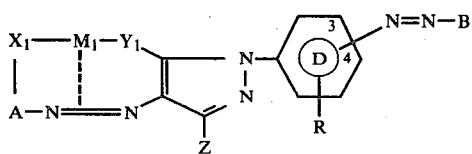

in which
$X_1$ is —O—, —NH— or —COO—,
$Y_1$ is —O— or —NH—,
M is copper or nickel, and A, B, R and Z are as defined above.

The preferred 1:2 metal complexes are of formula $I_b$,

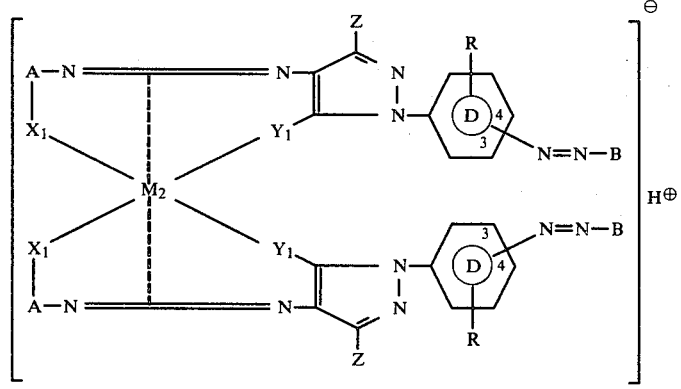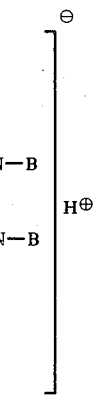

in which
each $X_1$, independently, is as defined above,
each $Y_1$, independently, is as defined above,
$M_2$ is chromium, cobalt or iron, and
each B, R, Z and A is as defined above. The two B's, R's; Z's and A's may be the same or different.

In formulae $I_a$ and $I_b$, each B—N=N— group is independently in the 3- or 4-position or ring D and, preferably, each $X_1$ is independently —O— or —COO— and each A—$X_1$— is independently derived from 1-amino-2-hydroxy-4-sulfonaphthalene 1-amino-2-hydroxy-6-nitro-4-sulfonaphthalene or an ortho-aminohydroxybenzene or ortho-aminocarboxybenzene which is further unsubstituted or further substituted by one or two substituents selected from halogen, $C_{1-4}$alkyl, $C_{1-4}$alkoxy, nitro, carboxy, acetamido, sulfo and —$SO_2NR_1R_2$, with the proviso that not more than one substituent is selected from acetamido, sulfo and —$SO_2NR_1R_2$. The preferred 1:1 and 1:2 complexes of the preceding group are those wherein each B is independently the radical of a coupling component of formula ($b_1$), ($b_2$), ($b_3$), ($b_4$) or ($b_5$); of these 1:2 complexes, those containing two sulfo groups and wherein each B is independently the radical of a coupling component of formula ($b_1'$), wherein $R_8$ is methyl or carboxy, especially methyl, and $W_1$ is hydrogen or sulfo, are preferred.

Suitable water-solubilising groups in the compounds of formula I are sulphonamido, carboxy and sulpho. Preferred water-solubilising groups are carboxy and sulpho. The compounds of formula I preferably contain at least one sulpho group. Preferred compounds contain 1 or 2 sulpho groups, most preferably a single sulpho group. When the compounds of formula I contain a carboxy and/or sulpho group, such groups may be in the free acid or non-chromophoric salt form. Suitable salt forms are those common in anionic dyestuffs, for example alkali metal salts and ammonium salts. The preferred salts are lithium, sodium and potassium salts, especially sodium salts. The negative charge on the metal of the 1:2 complexes may be compensated by a hydrogen ion or a non-chromophoric cation, which cation may be one of those mentioned above for salt forms of such acid water-solubilising groups.

Preferred complexes of formula $I_a$ are:
(i) those in which A—$X_1$— is derived from ($a_1$) or ($a_2$), B is derived from components ($b_1$) to ($b_6$), especially ($b_1$) to ($b_5$);
(ii) those of (i) in which R and Z have the preferred significances given above, with the copper complexes being especially preferred, especially those of (i) and (ii) which contain 1 or 2 sulpho groups,
(iii) those of (ii) wherein A—$X_1$— is ($a_1'$) or ($a_1''$), $Y_1$ is —O—, Z is methyl, R is hydrogen and B is derived from ($b_1$) to ($b_5$),
(iv) those of (iii) in which B is derived from ($b_1$),
(v) those of (iv) in which A—$X_1$— is ($a_1''$) where $R_5''$ is —$SO_2NR_1R_2$, preferably —$SO_2NR_1'R_2'$, more preferably —$SO_2NHR_2''$, the —N=N—B group is in the 4-position and ($b_1$) is ($b_1'$) in which $R_8$ is methyl and $W_1$ is sulpho.
(vi) those of (i) wherein A—$X_1$— is a group of formula ($a_1'$) or ($a_1''$), R is hydrogen, $Y_1$ is —O—, and Z is methyl,
(vii) those of (vi) which contain a single sulfo group and wherein B is the radical of a coupling component of formula ($b_1'$), wherein $R_8$ is methyl or carboxy, and $W_1$ is hydrogen or sulfo, and
(viii) those of (i) wherein A—$X_1$— is a group of formula ($a_1''$), wherein $R_5''$ is —$SO_2NR_1R_2$, B is the radical of a coupling component of formula ($b_1$), ($b_2$), ($b_3$), ($b_4$) or ($b_5$), and the B—N=N— group is in the 4-position of ring D. The preferred 1:2 complexes are
(i) those of formula $I_b$ in which each A—$X_1$— independently, is derived from ($a_1$) or ($a_2$), each B, independently, is derived from components ($b_1$) to ($b_6$), especially ($b_1$) to ($b_5$), especially those which contain 1 or 2 sulpho groups,
(ii) those of (i) in which R and Z have the preferred significances given above, especially the chromium and cobalt complexes, (iii) those of (ii) where each $Y_1$ is —O—, each Z is methyl, each R is hydrogen, and each B, independently, is derived from ($b_1$) to ($b_5$), (iv) those of (iii) in which each B, independently, is derived from ($b_1$), (v) those of (iv) in which each A—$X_1$— independently is ($a_1''$) where $R_5''$ is —$SO_2NR_1R_2$, preferably —$SO_2NR_1'R_2'$, more preferably —$SO_2NHR_2''$, each —N=N—B is in the 4-position and each ($b_1$), independently, is ($b_1'$) in which $R_8$ is methyl and $W_1$ is sulpho, (vi) those of (i) wherein each A—$X_1$— is independently a group of formula ($a_1'$) or ($a_1''$), each R is hydrogen, each $Y_1$ is —O—, and each Z is methyl, (vii) those of (i) wherein each A—$X_1$— is independently a group of formula ($a_1''$), wherein $R_5''$ is —$SO_2NR_1R_2$, each B is independently the radical of a coupling component of formula ($b_1$), ($b_2$), ($b_3$), ($b_4$) or ($b_5$), each B—N=N— group is in the 4-position of ring D, and (viii) those of (vii) wherein each $R_5''$ is sulfamoyl or o-carboxyphenylsulfamoyl, each B is the radical of a coupling component of formula ($b_1'$), wherein $R_8$ is methyl, and $W_1$ is sulfo, and $M_2$ is cobalt.

The preferred metallizable compounds of formula I are those which correspond to (i) to (v) of the complexes of formula $I_a$.

The present invention also provides a process for the production of compounds of formula I comprising coupling a diazotized compound of formula II,

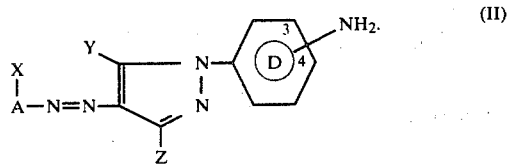

in which W is an amino group, with a coupling component of the formula H—B wherein B is the radical of a coupling component of the heterocyclic or non-cyclic active methylene series.

The metallizable compounds of formula I wherein B is the radical of a coupling component of the monocyclic benzene series may be prepared in analogous manner. Acylation or etherification of any hydroxy or amino group on said component B may be effected in known manner.

The diazotization and coupling reactions may be effected in accordance with known methods.

The present invention still further provides a process for the production of metal complexes of compounds of formula I comprising metallizing a compound of formula I or a mixture thereof, or a compound of formula I and a further metallizable compound, with a metal salt. However, any alkylation or acylation of an amino or phenolic hydroxy group on B is preferably effected after metallization.

The metallization reaction may be carried out in accordance with known methods. Advantageously, a stoichiometric amount to 10% excess of the metal salt is employed. When 1:2 asymmetric chromium complexes are desired, a 1:1 complex can be prepared first and then reacted with a further metallizable compound or a compound of formula I.

The metal complexes may be isolated in accordance with known methods, for example by adjusting the pH value to a neutral to weakly acid value and/or by salting out etc.

The complexes according to the invention are useful as dyestuffs. In particular the 1:1 complexes which contain an acid water-solubilising group, i.e. sulpho or carboxy, and the 1:2 complexes are useful as dyestuffs for dyeing and printing anionic-dyeable substrates. Among suitable anionic dyeable substrates are natural and regenerated cellulose, natural and synthetic polyamides, basic modified polypropylene, polyurethane and anodised aluminum. Preferred substrates are nylon, wool, silk, leather, sized paper and anodized aluminum. More preferred substrates are wool, silk, leather and anodized aluminum, especially leather. The textile substrates may be in loose fibre, yarn or filament form. The leather may be tanned in accordance with conventional processes e.g. vegetable, chromium tanned or combination tanned leather. The dyestuffs may be employed in the form of dyestuff preparations comprising dyestuff in conjunction with blending agents etc. as known in the art.

Dyeing may be effected in accordance with known methods. Thus, dyeing may be carried out by the exhaust method, padding method or printing method. The dyestuffs may be employed together with other dyestuffs.

The dyeings obtained with the anionic complexes according to the present invention have good light fastness, especially the leather dyeings. The complexes, especially the 1:2 metal complexes, particularly those containing 1 or 2 sulpho groups per molecule have good build-up power, especially on leather on which they give level, brilliant, intense yellow to brown or red dyeings with good dye yield. The dyeings, especially the leather dyeings, have good wet fastness and diffusion fastness in PVC. The cobalt complexes give dyeings having excellent light fastness.

The following Examples further serve to illustrate the invention. In the Examples all parts are by weight and all temperatures are in degrees Centigrade. Unless otherwise stated, adjustment of the pH to alkaline is carried out by the addition of 30% sodium hydroxide solution and to acid by the addition of 30% hydrochloric acid.

EXAMPLE I

189 Parts 2-amino-1-hydroxybenzene-4-sulphonic acid are diazotized in conventional manner with hydrochloric acid and sodium nitrite and the diazo compound is coupled with 189 parts 1-(4'-aminophenyl)-3-methyl-5-pyrazolone employing a pH of from 7 to 13. The dyestuff is isolated with sodium chloride, stirred in water and with the addition of hydrochloric acid and sodium nitrite diazotized in known manner. At pH 8 to 13 the diazonium compound is coupled with 174 parts 3-methyl-1-phenylpyrazolone dissolved in water. The disazo dye is reacted with 140 parts cobalt sulfate.heptahydrate at pH 10 at 80° for 30 minutes to form the 1:2 cobalt complex. The product is isolated at pH 7 with sodium chloride.

The orange powder corresponding to the compound of Example 1 of Table 1 has good build-up on leather and gives brilliant orange dyeings with good dyestuff yield. The dyeings have good light fastness and good diffusion fastness (migration resistance) in PVC.

EXAMPLE II

308 Parts 2-amino-1-hydroxybenzene-4-sulphonic acid anthranilide are diazotized in known manner. The diazonium compound is coupled with an alkaline solution of 1-(4'-aminophenyl)-3-methyl-5-pyrazolone with stirring at 0° to 5°. After adding 140 parts cobalt sulfate.heptahydrate at pH 9 and with heating to 80° for 30 minutes the 1:2 cobalt complex is formed. The dye is isolated by adding sodium chloride and subsequently stirred in water and diazotized in known manner. The diazonium compound is coupled with a solution of 174 parts 3-methyl-1-(4'-sulphophenyl)-5-pyrazolone in water. The orange-yellow dye is isolated using sodium chloride, dried and ground. The product which corresponds to the compound of Example 5 of Table 1 has good build-up on leather and gives brilliant dyeings in good yields with notable light fastness and diffusion fastness in PVC.

EXAMPLE III

189 Parts 2-amino-1-hydroxybenzene-4-sulphonic acid are diazotized in known manner and coupled at pH 7 to 13 with 189 parts 1-(4'-aminophenyl)-3-methyl-5-pyrazolone. The compound obtained is isolated with sodium chloride, dissolved in water and diazotized. The diazo suspension is coupled at pH 11 at 0° to 5° with 110 parts m-cresol. The solution is reacted with 140 parts cobalt sulfate.heptahydrate and heated to 80°–90° for 30 minutes to obtain the 1:2 complex which corresponds to the compound of Example 26 of Table 1.

The compound of Example 30 of Table 1 is obtained by adding 300 parts p-toluenesulphochloride and sodium hydroxide at 60° (pH 9–10) to tosylate the free hydroxy group. After adding sodium chloride and adjusting the pH to 6, the dyestuff is isolated. After drying, an orange pH-stable dyestuff having good build-up on leather and giving leather dyeings in good yields with good light fastness and diffusion fastness in PVC is obtained.

When benzenesulphochloride is used in place of toluenesulphochloride the compound of Example 29 of Table 1 is obtained. Similarly, the hydroxy group can be etherified by using dimethylsulphate to obtain the compound of Example 27 of Table 1.

In place of meta-cresol, the following compounds may be used and after metallization may be etherified or esterified: o-cresol, p-cresol, 1-hydroxy-4-ethylbenzene, 1-hydroxy-4-tert.-butyl-benzene, 1-hydroxy-2-ethylbenzene, 1-hydroxy-2-isopropylbenzene, 1-hydroxy-2-sec. butylbenzene, 3-hydroxy-1,2-dimethylbenzene, o- or p-chlorophenol, 2-hydroxy-1,4-dimethylbenzene, 4-hydroxy-1,2-dimethylbenzene, 2-hydroxy-1,3-diethylbenzene, 1-hydroxy-2- or 3-methoxybenzene, 1-hydroxy-3-ethoxybenzene, 1-hydroxy-3- or 4-butoxybenzene and 6-chloro-2-methylphenol.

The other compounds in Table 1 can be produced in analogy with the procedures described in Examples I to III (chromation is effected with chrome alum at pH 4.5–5). The 1:2 metal complexes correspond, in the free acid form, to the general formula

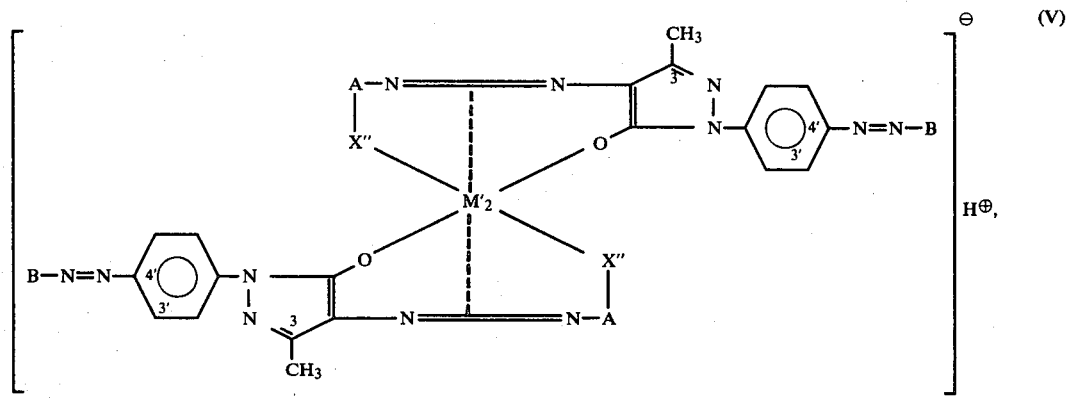

wherein X" is —O— or —COO— depending on the significances of X in the Table and the metal-free compounds correspond to the general formula

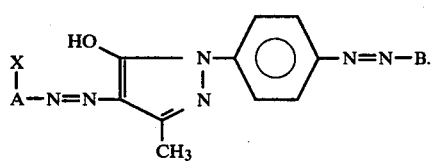

The complexes when isolated using sodium chloride are obtained in the sodium salt form. The free acid form and other salt forms may be obtained by known methods.

TABLE 1

| Example No. | X—A— | —B | M'$_2$ | Shades on leather |
|---|---|---|---|---|
| 1 | OH, SO$_3$H (on benzene) | OH, N—N—phenyl, CH$_3$ (pyrazolone) | Co | orange |

TABLE 1-continued

| Example No. | X—A— | —B | M'₂ | Shades on leather |
|---|---|---|---|---|
| 2 | 4-sulfamoyl-2-methylphenol (OH, CH₃, SO₂—NH₂) | " | Co | " |
| 3 | 5-sulfo-2-methylbenzoic acid (COOH, CH₃, HO₃S) | " | Co | " |
| 4 | 4-(phenylsulfamoyl)-2-methylphenol (OH, CH₃, SO₂NH—Ph) | OH—C=N—N=C(CH₃)—, coupled to C₆H₄—SO₃H | Co | " |
| 5 | 2-[(4-hydroxy-3-methylphenyl)sulfonylamino]benzoic acid (OH, CH₃, SO₂NH—C₆H₄—COOH) | " | Co | " |
| 6 | 2-methyl-4-nitrophenol (OH, CH₃, NO₂) | " | Co | " |
| 7 | 4-sulfamoyl-2-methylphenol (OH, CH₃, SO₂NH₂) | " | Co | " |
| 8 | 4-sulfo-2-methylphenol (OH, CH₃, SO₃H) | " | Co | " |
| 9 | 3-methyl-2-nitro-4-sulfophenol (NO₂, OH, CH₃, SO₃H) | " | Co | " |
| 10 | 2-hydroxy-3-methyl-5-nitrobenzenesulfonic acid (HO₃S, OH, CH₃, NO₂) | " | Co | " |
| 11 | 2-methyl-4,6-dinitrophenol (NO₂, OH, CH₃, NO₂) | " | Co | " |
| 12 | 2-methylbenzoic acid (COOH, CH₃) | " | Co | " |

TABLE 1-continued

| Example No. | X—A— | —B | M'$_2$ | Shades on leather |
|---|---|---|---|---|
| 13 | 2-hydroxy-3-methyl-5-sulfophenyl (OH, CH$_3$, SO$_3$H) | CH$_3$—CO—CH(—)—CO—NH—phenyl | Co | yellow |
| 14 | 2-hydroxy-3-methyl-5-sulfophenyl | CH$_3$—CO—CH(—)—CONH—(naphthyl-SO$_3$H) | Co | " |
| 15 | 1-hydroxy-2-methyl-4-sulfo-7-nitro-naphthyl (HO$_3$S, OH, O$_2$N) | 3-methyl-1-phenyl-5-hydroxypyrazole azo (OH, N=N, CH$_3$, phenyl) | Co | red |
| 16 | 2-hydroxy-5-nitro-phenyl (OH, O$_2$N) | 3-methyl-1-(4-sulfophenyl)-5-hydroxypyrazole azo (OH, N=N, CH$_3$, C$_6$H$_4$-SO$_3$H) | Co | orange |
| 17 | 3-(methoxycarbonylamino)-benzoic acid (COOH, H$_3$C—OC—NH) | " | Co | " |
| 18 | 3-(phenylaminosulfonyl)-benzoic acid (COOH, phenyl-NH—SO$_2$) | " | Co | " |
| 19 | bis(2-carboxyphenyl)sulfonamide (COOH, HN—O$_2$S, COOH) | " | Co | " |
| 20 | 3-hydroxy-4-carboxy-5-sulfophenyl (HOOC, OH, SO$_3$H) | " | Co | " |
| 21 | 2-hydroxy-3-methyl-5-sulfophenyl (OH, SO$_3$H) | —phenyl—OH | Co | yellow-orange |
| 22 | " | —phenyl—OCH$_3$ | Co | " |
| 23 | " | —phenyl—OC$_2$H$_5$ | Co | " |
| 24 | " | —phenyl—OSO$_2$—phenyl | Co | " |
| 25 | " | —phenyl—OSO$_2$—phenyl—CH$_3$ | Co | " |

TABLE 1-continued

| Example No. | X—A— | —B | M'$_2$ | Shades on leather |
|---|---|---|---|---|
| 26 | " | 3-methyl-4-hydroxyphenyl (OH, CH$_3$) | Co | " |
| 27 | " | 3-methyl-4-methoxyphenyl (OCH$_3$, CH$_3$) | Co | " |
| 28 | " | 3-methyl-4-ethoxyphenyl (OC$_2$H$_5$, CH$_3$) | Co | " |
| 29 | " | 3-methyl-4-(phenylsulfonyloxy)phenyl (—OSO$_2$—C$_6$H$_5$, CH$_3$) | Co | " |
| 30 | " | 3-methyl-4-(p-tolylsulfonyloxy)phenyl (—OSO$_2$—C$_6$H$_4$—CH$_3$, CH$_3$) | Co | " |
| 31 | " | 8-hydroxyquinoline derivative (OH, N) | Co | yellow-brown |
| 32 | 4-hydroxy-3-methyl-phenylsulfamoyl (OH, CH$_3$, SO$_2$NH—C$_6$H$_5$) | 1-(4-sulfophenyl)-3-methyl-5-hydroxypyrazolyl azo (OH, N=N—C$_6$H$_4$—SO$_3$H, CH$_3$) | Cr | red-orange |
| 33 | " | 2-chloro-5-sulfophenylazo pyrazolone (OH, Cl, N=N, SO$_3$H, CH$_3$) | Cr | " |
| 34 | " | 3-sulfophenylazo pyrazolone (HO, N=N, SO$_3$H, CH$_3$) | Cr | " |
| 35 | 4-hydroxy-3-methyl-sulfophenyl (OH, CH$_3$, SO$_3$H) | 3-cyano-4,6-dimethyl-2-oxo-6-hydroxypyridine (CH$_3$, CN, HO, N—H, O) | Cr | red |
| 36 | " | pyrimidine tetraol (OH, OH, N, HO, N, OH) | Cr | orange |

TABLE 1-continued

| Example No. | X—A— | —B | M'₂ | Shades on leather |
|---|---|---|---|---|
| 37 | " | 4-methyl-8-hydroxyquinoline | Cr | brown-orange |
| 38 | " | OH—C(=N-N-C₆H₄-SO₃H)—C(CH₃)= | Cr | brown olive |
| 39 | 2-hydroxy-3-methyl-5-(SO₂NH-C₆H₄-COOH)-phenyl | " | Cr | " |
| 40 | 2-nitro-6-methyl-4-sulfo-phenol | " | Cr | " |
| 41 | 2-hydroxy-3-methyl-5-nitro-6-sulfo-phenyl | 4-methyl-8-hydroxyquinoline | Cr | " |

EXAMPLE IV

The unmetallized disazo dyestuff produced as described in Example I is treated with 249 parts crystalline Cu-II-sulphate.5H₂O for 1 hour in an aqueous solution (pH 8–9) of 80°–90°. The copper complex, after having been isolated as described in Example I, dyes leather in red-brown fast shades. The product corresponds to the compound of Example 42 of Table 2.

The other compounds in the following Table 2 may be prepared in analogy with the procedure of Example IV. The complexes correspond in the free acid form to the general formula,

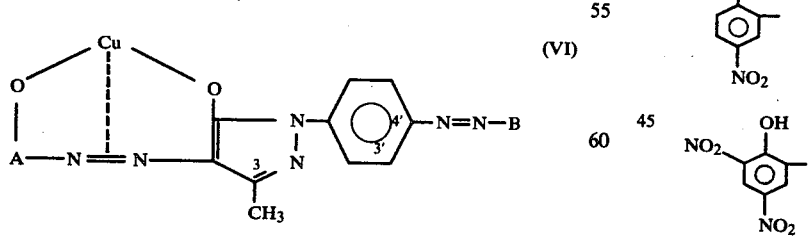

(VI)

TABLE 2

| Example No. | HO—A— | —B | Shades on leather |
|---|---|---|---|
| 42 | 2-hydroxy-3-methyl-5-sulfo-phenyl | 5-hydroxy-3-methyl-1-phenyl-pyrazole | red-brown |
| 43 | 2-hydroxy-3-methyl-5-sulfamoyl-phenyl | 5-hydroxy-3-methyl-1-(4-sulfophenyl)-pyrazole | " |
| 44 | 2-hydroxy-3-methyl-5-nitro-phenyl | " | " |
| 45 | 2-hydroxy-3-nitro-5-nitro-phenyl | " | " |

TABLE 2-continued

| Example No. | HO—A— | —B | Shades on leather |
|---|---|---|---|
| 46 | HO₃S, OH, CH₃, NO₂ on benzene | HO—pyrazole with N-phenyl, CH₃ | " |
| 47 | NO₂, OH, SO₃H on benzene | naphthol-quinoline type with OH, N | " |

EXAMPLE V

Proceeding according to the above Examples but replacing the 1-(4′-aminophenyl)-3-methyl-5-pyrazolone middle component with the corresponding amount of 1-(3′-aminophenyl)-3-methyl-5-pyrazolone, complexes with similar shades to the corresponding 4′-isomer complexes are obtained.

EXAMPLE VI

Proceeding according to the above Examples but replacing with the corresponding amount of 1-(4′-aminophenyl)-3-carboxy-5-pyrazolone, dyestuffs with similar shades to the corresponding 3-methyl complexes are obtained.

EXAMPLE VII

Proceeding according to the above Examples but replacing with the corresponding amount of 1-(3′-aminophenyl)-3-carboxy-5-pyrazolone, complexes are obtained which have similar dye shades to the corresponding 1-(4′-aminophenyl)-3-methyl complexes.

The dyestuffs of the preceding Examples were blended with 50% Glauber's salt. In the following Dyeing Examples the amount of dyestuff given is of the non-blended dyestuff.

DYEING EXAMPLE A

100 Parts of shaved weight freshly chrome-tanned and neutralised grain leather are put into a bath containing 250 parts water and 0.5 parts of the complex of Example I and are drummed for 30 minutes at 55°. Then the leather is treated in the same bath with 2 parts anionic fat liquor based on sulphonated train oil for 30 minutes and the leather is dried and finished in conventional manner. A brilliant orange intense dyeing with good light fastness is obtained.

DYEING EXAMPLE B

100 Parts chrome-tanned suede split leather together with 1000 parts water and 2 parts ammonia are drummed for 4 hours and are dyed in a fresh bath containing 500 parts water at 55°, 2 parts ammonia and 5 parts dissolved dyestuff of Example 1 for 30 minutes. 4 Parts of 85% formic acid are slowly added to exhaust the dyebath and treatment is continued until full fixation of the dyestuff occurs. After rinsing, drying and finishing in the usual manner, an intense orange dyeing having good light fastness is obtained.

DYEING EXAMPLE C 100 parts of chrome-vegetable-tanned lamb's leather and 5 parts dyestuff of Example I are milled in a bath containing 1000 parts water at 55° and 1.5 parts anionic sperm oil emulsion for 45 minutes and the dyestuff is fixed by the slow addition of 5 parts 85% formic acid over a period of 30 minutes. After the conventional drying and finishing processes, an intense orange dyeing with good light fastness is obtained.

DYEING EXAMPLE D

A solution of 20 parts dyestuff of Example I in 847 parts water, 150 parts ethylene glycol and 3 parts 85% formic acid are applied to the grain side of a polished combination-tanned box side leather by spraying, plushing and pouring. The leather is then dried and finished under mild conditions and an intense brilliant orange dyeing having good fastness is obtained.

In analogy with the procedure of Examples A to D the complexes of Examples I to VII and the additional complexes of the Tables can be employed to give leather dyeings having the indicated shades in each case.

What is claimed is:

1. A metal complex of a disazo compound of the formula

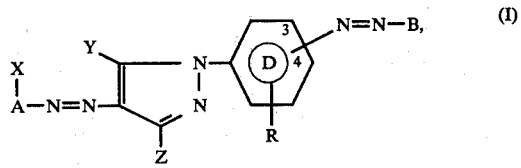

or a salt thereof each cation of which is non-chromophoric, wherein

A–X is the radical of a diazo component,
  wherein X is a metallizable group or a substituent convertible to a metallizable group, with the proviso that X is ortho to the —N=N— radical, B is the radical of a coupling component of the formula

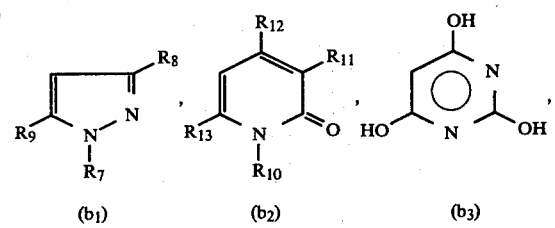

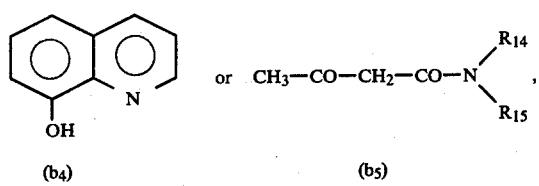

wherein $R_7$ is hydrogen,

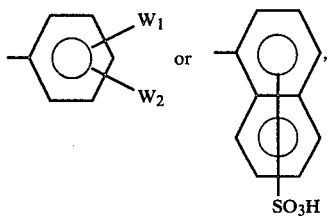

wherein $W_1$ is hydrogen, chloro, methyl, methoxy, cyano, nitro, carboxy, $-SO_2NW_3W_4$ or sulfo, wherein each of $W_3$ and $W_4$ is independently hydrogen, $C_{1-4}$-alkyl or $C_{2-4}$-alkyl substituted in the 2-, 3- or 4-position by hydroxy or $C_{1-4}$-alkoxy, and $W_2$ is hydrogen, chloro, methyl, methoxy or carboxy, $R_8$ is $C_{1-4}$alkyl, phenyl, carboxy or $-CONW_3W_4$, wherein each of $W_3$ and $W_4$ is independently hydrogen, $C_{1-4}$alkyl or $C_{2-4}$-alkyl substituted in the 2-, 3- or 4-position by hydroxy or $C_{1-4}$alkoxy, $R_9$ is $-OH$ or $-NH_2$, $R_{10}$ is hydrogen; amino; phenylamino; $C_{1-8}$alkyl; $C_{6-9}$cycloalkyl; cycloalkyl substituted by 1, 2 or 3 alkyl groups, the total number of carbon atoms therein being 6 to 9, inclusive; carboxy($C_{1-4}$alkyl); $C_{2-4}$alkyl substituted by hydroxy, methoxy, ethoxy or sulfo, with the proviso that any hydroxy, methoxy or ethoxy substituent is in the 2-, 3- or 4-position;

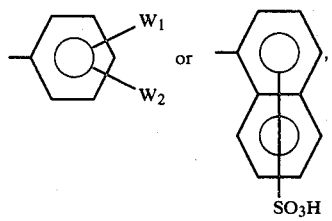

wherein $W_1$ and $W_2$ are as defined above, $R_{11}$ is hydrogen, carboxy, sulfo, acetyl or cyano, $R_{12}$ is hydrogen, hydroxy, methyl, carboxy, phenyl or sulfomethylene, $R_{13}$ is hydrogen, hydroxy or methyl, with the proviso that at least one of $R_{12}$ and $R_{13}$ is hydroxy, $R_{14}$ is hydrogen or $C_{1-4}$alkyl, and $R_{15}$ is $C_{1-8}$alkyl; $C_{6-9}$cycloalkyl; cycloalkyl substituted by 1, 2 or 3 alkyl groups, the total number of carbon atoms therein being 6 to 9, inclusive;

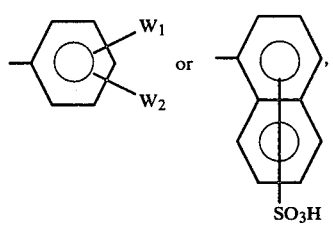

wherein $W_1$ and $W_2$ are as defined above, with the proviso that the $-N=N-B$ group is in the 3- or 4-position of Ring D, R is hydrogen, halo, methyl or sulfo, Y is $-OH$ or $-NH_2$, and Z is methyl or carboxy, wherein each halo is independently fluoro, chloro, bromo or iodo, with the provisos that (i) the disazo compound contains at least one water-solubilizing group and (ii) the metal complex may be in salt form only if the disazo compound contains at least one sulfo or carboxy group or if it is a 1:2 metal complex.

2. A metal complex according to claim 1, or a salt thereof each cation of which is non-chromophoric, said complex being a 1:1 metal complex of a disazo compound of formula I, a symmetrical 1:2 metal complex of a disazo compound of formula I, an asymmetrical 1:2 metal complex of disazo compounds of formula I or a 1:2 metal complex of a disazo compound of formula I and a further metallizable compound.

3. A metal complex according to claim 2, or a salt thereof each cation of which is non-chromophoric, with the proviso that the disazo compound contains at least one water-solubilizing group selected from the group consisting of sulfo, carboxy, sulfamoyl and substituted sulfamoyl.

4. A metal complex according to claim 3, or a salt thereof each cation of which is non-chromophoric, wherein A-X is

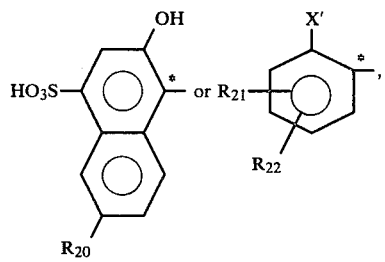

wherein $R_{20}$ is hydrogen or nitro, $R_{21}$ is hydrogen, halo, $C_{1-4}$alkyl, $C_{1-4}$alkoxy, nitro, carboxy, acetamido, sulfo or $-SO_2NR_1R_2$, wherein $R_1$ is hydrogen or $C_{1-4}$alkyl, and $R_2$ is hydrogen, $C_{1-4}$alkyl or

wherein $R_3$ is hydrogen, halo, $C_{1-4}$alkyl, $C_{1-4}$-alkoxy or carboxy, $R_{22}$ is hydrogen, halo, $C_{1-4}$alkyl, $C_{1-4}$alkoxy, nitro or carboxy, X' is hydroxy or carboxy, and the * indicates the carbon atom bound to the $-N=N-$ radical.

5. A metal complex according to claim 4, or a salt thereof each cation of which is non-chromophoric, with the proviso that the disazo compound contains at least one sulfo group.

6. A metal complex according to claim 4, or a salt thereof each cation of which is non-chromophoric, wherein
A—X is (a₁) [structure: phenol with R₄ ortho to OH, R₅ para, * marked] or (a₂) [structure: benzene with X' and *, R₆ para]

wherein
$R_4$ is hydrogen, carboxy, sulfo or nitro,
$R_5$ is hydrogen, chloro, nitro, sulfo or —SO₂NR₁R₂,
wherein
$R_1$ is hydrogen or $C_{1-4}$alkyl, and
$R_2$ is hydrogen, $C_{1-4}$alkyl or

[phenyl with R₃ substituent], wherein
$R_3$ is hydrogen, halo, $C_{1-4}$alkyl, $C_{1-4}$-alkoxy or carboxy,
with the provisos that not more than one of $R_4$ and $R_5$ is hydrogen and when $R_5$ is sulfo or —SO₂NR₁R₂, $R_4$ is hydrogen, carboxy or nitro,
$R_6$ is hydrogen, nitro, —SO₂NR₁R₂, sulfo or acetamido,
wherein
$R_1$ is hydrogen or $C_{1-4}$alkyl, and
$R_2$ is hydrogen, $C_{1-4}$alkyl or

[phenyl with R₃ substituent], wherein
$R_3$ is hydrogen, halo, $C_{1-4}$alkyl, $C_{1-4}$-alkoxy or carboxy,
X' is hydroxy or carboxy, and
the * indicates the carbon atom bound to the —N=N— radical.

7. A metal complex according to claim 6, or a salt thereof each cation of which is non-chromophoric, wherein A—X is (a₁) [phenol with R₄, R₅, *]

8. A metal complex according to claim 7, or a salt thereof each cation of which is non-chromophoric, wherein
A—X is (a'₁) [phenol with R'₄ ortho, R'₅ para, *] or (a''₁) [phenol with R''₅ para, *], wherein
$R_4'$ is nitro or sulfo,
$R_5'$ is nitro or sulfo, with the proviso that not more than one of $R_4'$ and $R_5'$ is sulfo,
$R_5''$ is nitro or —SO₂NR₁R₂,
wherein
$R_1$ is hydrogen or $C_{1-4}$alkyl, and
$R_2$ is hydrogen, $C_{1-4}$alkyl or

[phenyl with R₃ substituent], wherein
$R_3$ is hydrogen, halo, $C_{1-4}$alkyl, $C_{1-4}$-alkoxy or carboxy, and
the * indicates the carbon atom bound to the —N=N— radical.

9. A metal complex according to claim 4, or a salt thereof each cation of which is non-chromophoric, wherein B is the radical of a coupling component of the formula (b₁) [pyrazole ring with R₈, R₉, R₇ on N] or (b₂) [pyridone ring with R₁₁, R₁₂, R₁₃, R₁₀ on N, =O]

10. A metal complex according to claim 9, or a salt thereof each cation of which is non-chromophoric, wherein B is the radical of a coupling component of the formula (b₁) [pyrazole with R₈, R₉, R₇]

11. A metal complex according to claim 10, or a salt thereof each cation of which is non-chromophoric, with the proviso that the disazo compound contains at least one sulfo group.

12. A metal complex according to claim 10, or a salt thereof each cation of which is non-chromophoric, wherein B is the radical of a coupling component of the formula

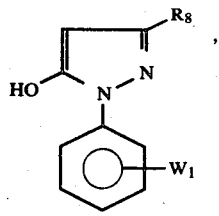 (b'₁)

wherein
R₈ is $C_{1-4}$alkyl, phenyl, carboxy or —CONW₃W₄,
wherein each of W₃ and W₄ is independently hydrogen, $C_{1-4}$alkyl or $C_{2-4}$-alkyl substituted in the 2-, 3- or 4-position by hydroxy or $C_{1-4}$alkoxy, and
W₁ is hydrogen, chloro, methyl, methoxy, cyano, nitro, carboxy, —SO₂NW₃W₄ or sulfo,
wherein each of W₃ and W₄ is independently hydrogen, $C_{1-4}$alkyl or $C_{2-4}$-alkyl substituted in the 2-, 3- or 4-position by hydroxy or $C_{1-4}$alkoxy.

13. A metal complex according to claim 3 having the formula

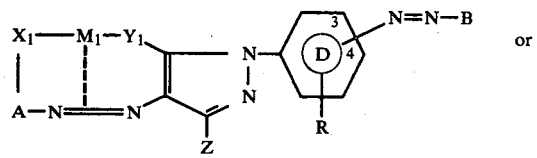 (I_a)

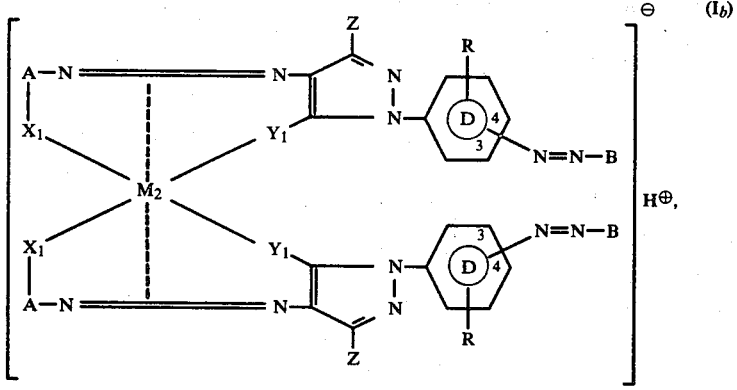 (I_b)

or a salt thereof each cation of which is non-chromophoric,
wherein each A—X₁ is independently

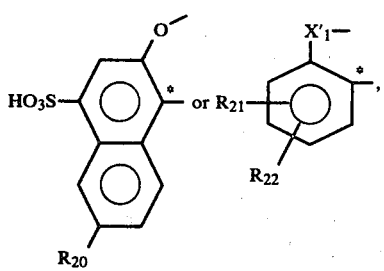

wherein
R₂₀ is hydrogen or nitro,
R₂₁ is hydrogen, halo, $C_{1-4}$alkyl, $C_{1-4}$alkoxy, nitro, carboxy, acetamido, sulfo or —SO₂NR₁R₂, wherein
R₁ is hydrogen or $C_{1-4}$alkyl, and
R₂ is hydrogen, $C_{1-4}$alkyl or

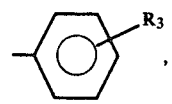

wherein
R₃ is hydrogen, halo, $C_{1-4}$alkyl, $C_{1-4}$-alkoxy or carboxy,
R₂₂ is hydrogen, halo, $C_{1-4}$alkyl, $C_{1-4}$alkoxy, nitro or carboxy,
X₁' is —O— or —COO—, and the * indicates the carbon atom bound to the —N=N— radical,
each B is independently the radical of a coupling component of the formula

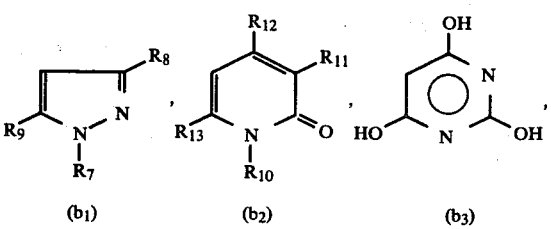

(b₁)  (b₂)  (b₃)

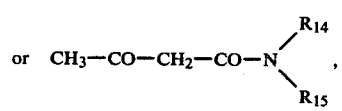

(b₄)  (b₅)

wherein
R₇ is hydrogen,

[Structure: benzene ring with W₁, W₂ substituents] or [naphthalene ring with SO₃H]

wherein

W₁ is hydrogen, chloro, methyl, methoxy, cyano, nitro, carboxy, —SO₂NW₃W₄ or sulfo,
wherein
each of W₃ and W₄ is independently hydrogen, $C_{1-4}$-alkyl or $C_{2-4}$-alkyl substituted in the 2-, 3- or 4-position by hydroxy or $C_{1-4}$-alkoxy, and W₂ is hydrogen, chloro, methyl, methoxy or carboxy, R₈ is $C_{1-4}$alkyl, phenyl, carboxy or —CONW₃W₄, wherein each of W₃ and W₄ is independently hydrogen, $C_{1-4}$alkyl or $C_{2-4}$-alkyl substituted in the 2-, 3- or 4-position by hydroxy or $C_{1-4}$alkoxy, R₉ is —OH or —NH₂, R₁₀ is hydrogen; amino; phenylamino; $C_{1-8}$alkyl; $C_{6-9}$cycloalkyl; cycloalkyl substituted by 1, 2 or 3 alkyl groups, the total number of carbon atoms therein being 6 to 9, inclusive; carboxy($C_{1-4}$alkyl); $C_{2-4}$alkyl substituted by hydroxy, methoxy, ethoxy or sulfo, with the proviso that any hydroxy, methoxy or ethoxy substituent is in the 2-, 3- or 4-position;

[Structure: benzene ring with W₁, W₂] or [naphthalene ring with SO₃H], wherein W₁ and W₂ are as defined above, R₁₁ is hydrogen, carboxy, sulfo, acetyl or cyano, R₁₂ is hydrogen, hydroxy, methyl, carboxy, phenyl or sulfomethylene, R₁₃ is hydrogen, hydroxy or methyl, with the proviso that at least one of R₁₂ and R₁₃ is hydroxy, R₁₄ is hydrogen or $C_{1-4}$alkyl, and R₁₅ is $C_{1-8}$alkyl; $C_{6-9}$cycloalkyl; cycloalkyl substituted by 1, 2 or 3 alkyl groups, the total number of carbon atoms therein being 6 to 9, inclusive;

[Structure: benzene ring with W₁, W₂] or [naphthalene ring with SO₃H], wherein

W₁ and W₂ are as defined above, with the proviso that each —N=N—B group is independently in the 3- or 4-position of Ring D, each R is independently hydrogen, halo, methyl or sulfo, each Y₁ is independently —O— or —NH—, each Z is independently methyl or carboxy, M₁ is copper or nickel, and M₂ is chromium, cobalt or iron, wherein each halo is independently fluoro, chloro, bromo or iodo, with the provisos that (i) each disazo compound of the metal complex contains at least one water-solubilizing group selected from the group consisting of sulfo, carboxy and —SO₂NR₁R₂ and (ii) a 1:1 metal complex may be in salt form only if it contains at least one sulfo or carboxy group.

14. A metal complex according to claim 13, or a salt thereof each cation of which is non-chromophoric, with the proviso that each disazo compound of the metal complex contains at least one sulfo group.

15. A 1:1 metal complex according to claim 13 having the formula $$X_1—M_1—Y_1 \cdots \text{(structure with A—N=N, N, Z, R, D ring, N=N—B)} \quad (I_a)$$

or a salt thereof each cation of which is non-chromophoric.

16. A 1:1 metal complex according to claim 15, or a salt thereof each cation of which is non-chromophoric, wherein A–X₁ is

[Structure: phenyl ring with O—, R₄, R₅ substituents] or [phenyl ring with X'₁—, R₆ substituents], wherein R₄ is hydrogen, carboxy, sulfo or nitro, R₅ is hydrogen, chloro, nitro, sulfo or —SO₂NR₁R₂,
wherein R₁ is hydrogen or $C_{1-4}$alkyl, and R₂ is hydrogen, $C_{1-4}$alkyl or

[Structure: phenyl ring with R₃ substituent], wherein

R₃ is hydrogen, halo, $C_{1-4}$alkyl, $C_{1-4}$-alkoxy or carboxy, with the provisos that not more than one of R₄ and R₅ is hydrogen and when R₅ is sulfo or —SO₂NR₁R₂, R₄ is hydrogen, carboxy or nitro, R₆ is hydrogen, nitro, —SO₂NR₁R₂, sulfo or acetamido, wherein
R₁ is hydrogen or C₁₋₄alkyl, and
R₂ is hydrogen, C₁₋₄alkyl or

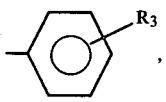

wherein
R₃ is hydrogen, halo, C₁₋₄alkyl, C₁₋₄-alkoxy or carboxy,
X₁' is —O— or —COO—, and
the * indicates the carbon atom bound to the —N═N— radical.

17. A 1:1 metal complex according to claim 16, or a salt thereof each cation of which is non-chromophoric, with the proviso that the 1:1 metal complex contains 1 or 2 sulfo groups.

18. A 1:1 metal complex according to claim 16, or a salt thereof each cation of which is non-chromophoric, wherein
A-X₁ is

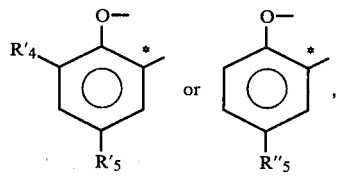

wherein
R₄' is nitro or sulfo,
R₅' is nitro or sulfo, with the proviso that not more than one of R₄' and R₅' is sulfo,
R₅" is nitro or —SO₂NR₁R₂,
wherein
R₁ is hydrogen or C₁₋₄alkyl, and
R₂ is hydrogen, C₁₋₄alkyl or

wherein
R₃ is hydrogen, halo, C₁₋₄alkyl, C₁₋₄-alkoxy or carboxy, and
the * indicates the carbon atom bound to the —N═N— radical,
R is hydrogen,
Y₁ is —O—, and
Z is methyl.

19. A 1:1 metal complex according to claim 18, or a salt thereof each cation of which is non-chromophoric, wherein M₁ is copper,
with the proviso that the 1:1 metal complex contains 1 or 2 sulfo groups.

20. A 1:1 metal complex according to claim 18, or a salt thereof each cation of which is non-chromophoric, wherein B is the radical of a coupling component of the formula

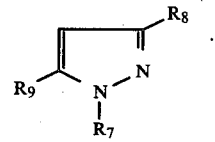

(b₁)

21. A 1:1 metal complex according to claim 20, or a salt thereof each cation of which is non-chromophoric, wherein M₁ is copper, with the proviso that the 1:1 metal complex contains 1 or 2 sulfo groups.

22. A 1:1 metal complex according to claim 20, or a salt thereof each cation of which is non-chromophoric wherein B is the radical of a coupling component of the formula

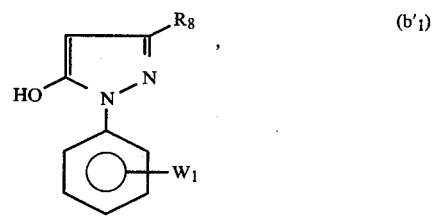

(b'₁)

wherein
R₈ is C₁₋₄alkyl, phenyl, carboxy or —CONW₃W₄,
wherein
each of W₃ and W₄ is independently hydrogen, C₁₋₄alkyl or C₂₋₄alkyl substituted in the 2-, 3- or 4-position by hydroxy or C₁₋₄alkoxy, and
W₁ is hydrogen, chloro, methyl, methoxy, cyano, nitro, carboxy, —SO₂NW₃W₄ or sulfo,
wherein W₃ and W₄ are as defined above.

23. A 1:1 metal complex according to claim 22, or a salt thereof each cation of which is non-chromophoric, wherein R₈ is methyl or carboxy, and
W₁ is hydrogen or sulfo, with the proviso that the 1:1 metal complex contains a single sulfo group.

24. A 1:1 metal complex according to claim 22, or a salt thereof each cation of which is non-chromophoric, wherein
A-X₁ is

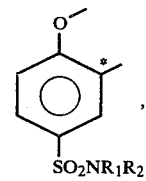

wherein
R₁ is hydrogen or C₁₋₄alkyl,
R₂ is hydrogen, C₁₋₄alkyl or

wherein
R₃ is hydrogen, halo, C₁₋₄alkyl, C₁₋₄-alkoxy or carboxy, and the * indicates the carbon atom bound to the —N=N— radical, and B is the radical of a coupling component of the formula

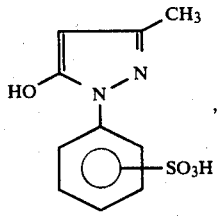

with the proviso that the —N=N—B group is in the 4-position of Ring D.

25. A 1:1 metal complex according to claim 24, or a salt thereof each cation of which is non-chromophoric, wherein $R_1$ is hydrogen or methyl, $R_2$ is hydrogen, methyl or

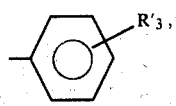

wherein $R_3'$ is hydrogen, chloro, methyl, methoxy or carboxy, and $M_1$ is copper.

26. A 1:1 metal complex according to claim 16, or a salt thereof each cation of which is non-chromophoric, wherein A-$X_1$ is

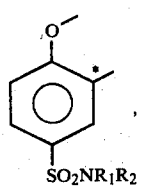

wherein $R_1$ is hydrogen or $C_{1-4}$alkyl, $R_2$ is hydrogen, $C_{1-4}$alkyl or

wherein $R_3$ is hydrogen, halo, $C_{1-4}$alkyl, $C_{1-4}$-alkoxy or carboxy, and the * indicates the carbon atom bound to the —N=N— radical, and the —N=N—B group is in the 4-position of Ring D.

27. A 1:1 metal complex according to claim 15, or a salt thereof each cation of which is non-chromophoric, wherein $R_{10}$ is hydrogen; amino; phenylamino; $C_{1-8}$alkyl; $C_{6-9}$cycloalkyl; cyclohexyl substituted by 1, 2 or 3 methyl groups; carboxy($C_{1-4}$alkyl); $C_{2-4}$-alkyl substituted by hydroxy, methoxy, ethoxy or sulfo, with the proviso that any hydroxy, methoxy or ethoxy substituent is in the 2-, 3- or 4-position;

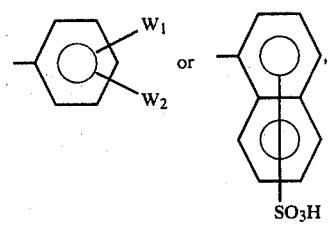

wherein $W_1$ is hydrogen, chloro, methyl, methoxy, cyano, nitro, carboxy, —$SO_2NW_3W_4$ or sulfo, wherein each of $W_3$ and $W_4$ is independently hydrogen, $C_{1-4}$-alkyl or $C_{2-4}$-alkyl substituted in the 2-, 3- or 4-position by hydroxy or $C_{1-4}$-alkoxy, and $W_2$ is hydrogen, chloro, methyl, methoxy or carboxy, and $R_{15}$ is $C_{1-8}$alkyl, $C_{6-9}$cycloalkyl, cyclohexyl substituted by 1, 2 or 3 methyl groups,

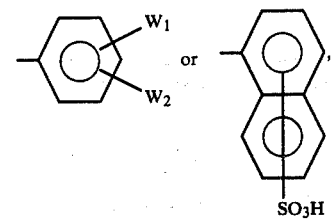

wherein $W_1$ and $W_2$ are as defined above.

28. A 1:2 metal complex according to claim 13 having the formula

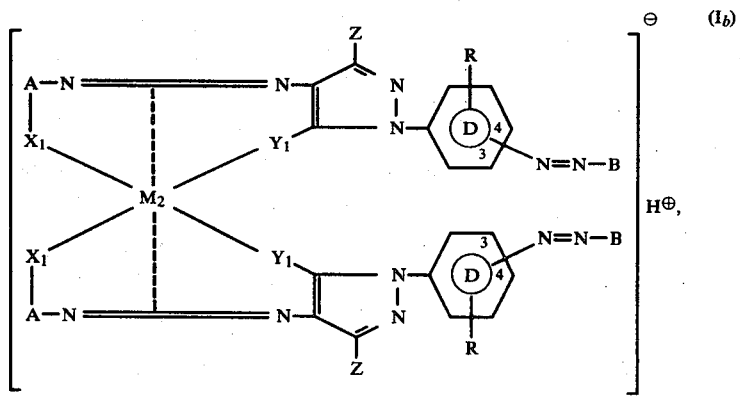

or a salt thereof each cation of which is non-chromophoric.

29. A 1:2 metal complex according to claim 28, or a salt thereof each cation of which is non-chromophoric, wherein each A—X₁ is independently

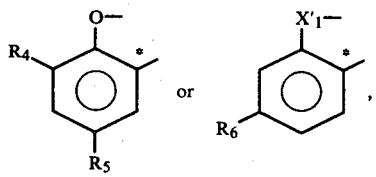

wherein
R₄ is hydrogen, carboxy, sulfo or nitro,
R₅ is hydrogen, chloro, nitro, sulfo or —SO₂NR₁R₂, wherein
R₁ is hydrogen or $C_{1-4}$alkyl, and
R₂ is hydrogen, $C_{1-4}$alkyl or

wherein
R₃ is hydrogen, halo, $C_{1-4}$alkyl, $C_{1-4}$-alkoxy or carboxy,
with the provisos that not more than one of R₄ and R₅ is hydrogen and when R₅ is sulfo or —SO₂NR₁R₂, R₄ is hydrogen, carboxy or nitro,
R₆ is hydrogen, nitro, —SO₂NR₁R₂, sulfo or acetamido,
wherein
R₁ is hydrogen or $C_{1-4}$alkyl, and
R₂ is hydrogen, $C_{1-4}$alkyl or

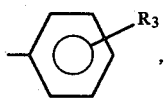

wherein
R₃ is hydrogen, halo, $C_{1-4}$alkyl, $C_{1-4}$-alkoxy or carboxy,
X₁' is —O— or —COO—, and the * indicates the carbon atom bound to the —N=N— radical.

30. A 1:2 metal complex according to claim 29, or a salt thereof each cation of which is non-chromophoric, with the proviso that the 1:2 metal complex contains 1 or 2 sulfo groups.

31. A 1:2 metal complex according to claim 29, or a salt thereof each cation of which is non-chromophoric, wherein each R is hydrogen,
each Y₁ is —O—, and
each Z is methyl.

32. A 1:2 metal complex according to claim 31, or a salt thereof each cation of which is non-chromophoric, wherein M₂ is chromium or cobalt,
with the proviso that the 1:2 metal complex contains 1 or 2 sulfo groups.

33. A 1:2 metal complex according to claim 31, or a salt thereof each cation of which is non-chromophoric, wherein each A-X₁ is independently

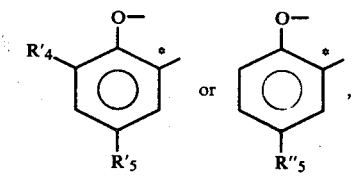

wherein
R₄' is nitro or sulfo,
R₅' is nitro or sulfo, with the proviso that not more than one of R₄' and R₅' is sulfo,
R₅'' is nitro or —SO₂NR₁R₂,
wherein
R₁ is hydrogen or $C_{1-4}$alkyl, and
R₂ is hydrogen, $C_{1-4}$alkyl or

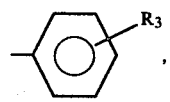

wherein
R₃ is hydrogen, halo, $C_{1-4}$alkyl, $C_{1-4}$-alkoxy or carboxy, and
the * indicates the carbon atom bound to the —N=N— radical.

34. A 1:2 metal complex according to claim 31, or a salt thereof each cation of which is non-chromophoric, wherein each B is independently the radical of a coupling component of the formula

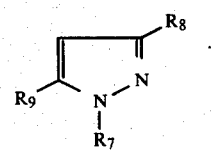 (b₁)

35. A 1:2 metal complex according to claim 34, or a salt thereof each cation of which is non-chromophoric, wherein M₂ is chromium or cobalt,
with the proviso that the 1:2 metal complex contains 1 or 2 sulfo groups.

36. A 1:2 metal complex according to claim 34, or a salt thereof each cation of which is non-chromophoric, wherein each
A-X₁ is independently

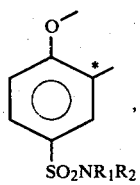

wherein
R₁ is hydrogen or C₁₋₄alkyl,
R₂ is hydrogen, C₁₋₄alkyl or

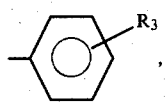

wherein
R₃ is hydrogen, halo, C₁₋₄alkyl, C₁₋₄-alkoxy or carboxy, and
the * indicates the carbon atom bound to the —N=N— radical,
each B is independently the radical of a coupling component of the formula

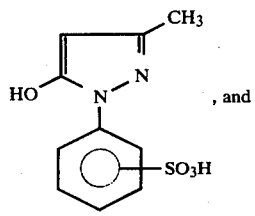, and each —N=N—B group is in the 4-position of Ring D.

37. A 1:2 metal complex according to claim 36, or a salt thereof each cation of which is non-chromophoric, wherein M₂ is chromium or cobalt.

38. A 1:2 metal complex according to claim 37, or a salt thereof each cation of which is non-chromophoric, wherein
R₁ is hydrogen or methyl, and
R₂ is hydrogen, methyl or

wherein
R₃' is hydrogen, chloro, methyl, methoxy or carboxy.

39. A 1:2 metal complex according to claim 38, or a salt thereof each cation of which is non-chromophoric, wherein
R₁ is hydrogen, and
R₂ is methyl, phenyl or carboxyphenyl.

40. A 1:2 metal complex according to claim 28, or a salt thereof each cation of which is non-chromophoric,
wherein each B is independently the radical of a coupling component of the formula

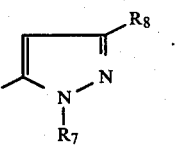 (b₁)

41. A 1:2 metal complex according to claim 40, or a salt thereof each cation of which is non-chromophoric, wherein each B is independently the radical of a coupling component of the formula

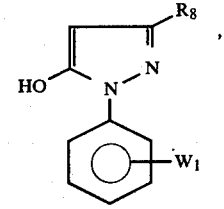 (b'₁)

wherein
R₈ is C₁₋₄alkyl, phenyl, carboxy or —CONW₃W₄,
wherein each of W₃ and W₄ is independently hydrogen, C₁₋₄alkyl or C₂₋₄alkyl substituted in the 2-, 3- or 4-position by hydroxy or C₁₋₄alkoxy, and
W₁ is hydrogen, chloro, methyl, methoxy, cyano, nitro, carboxy, —SO₂NW₃W₄ or sulfo,
wherein W₃ and W₄ are as defined above.

42. A 1:2 metal complex according to claim 41, or a salt thereof each cation of which is non-chromophoric, wherein
each R₈ is independently methyl or carboxy, and
each W₁ is independently hydrogen or sulfo, with the proviso that the 1:2 metal complex contains two sulfo groups.

43. A 1:2 metal complex according to claim 42, or a salt thereof each cation of which is non-chromophoric, wherein each R₈ is methyl.

44. A 1:2 metal complex according to claim 29, or a salt thereof each cation of which is non-chromophoric, wherein each
A-X₁ is independently

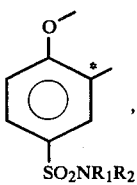

wherein $R_1$ is hydrogen or $C_{1-4}$alkyl, $R_2$ is hydrogen, $C_{1-4}$alkyl or

wherein $R_3$ is hydrogen, halo, $C_{1-4}$alkyl, $C_{1-4}$-alkoxy or carboxy, and the * indicates the carbon atom bound to the —N=N— radical, and each —N=N—B group is in the 4-position of Ring D.

45. A 1:2 metal complex according to claim 44, or a salt thereof each cation of which is non-chromophoric, wherein each B is the radical of a coupling component of the formula

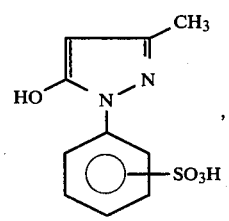

each $R_1$ is hydrogen, each $R_2$ is 2-carboxyphenyl, and $M_2$ is cobalt.

46. A 1:2 metal complex according to claim 44, or a salt thereof each cation of which is non-chromophoric, wherein each B is the radical of a coupling component of the formula

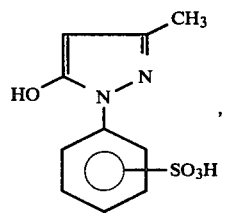

each $R_1$ is hydrogen, each $R_2$ is hydrogen, and $M_2$ is cobalt.

47. A 1:2 metal complex according to claim 28, or a salt thereof each cation of which is non-chromophoric, wherein $R_{10}$ is hydrogen; amino; phenylamino; $C_{1-8}$alkyl; $C_{6-9}$cycloalkyl; cyclohexyl substituted by 1, 2 or 3 methyl groups; carboxy ($C_{1-4}$alkyl); $C_{2-4}$-alkyl substituted by hydroxy, methoxy, ethoxy or sulfo, with the proviso that any hydroxy, methoxy or ethoxy substituent is in the 2-, 3- or 4-position;

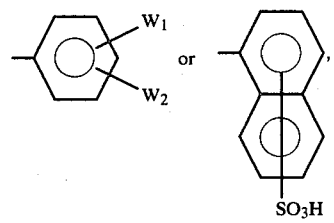

wherein $W_1$ is hydrogen, chloro, methyl, methoxy, cyano, nitro, carboxy, —SO$_2$NW$_3$W$_4$ or sulfo, wherein each of $W_3$ and $W_4$ is independently hydrogen, $C_{1-4}$-alkyl or $C_{2-4}$-alkyl substituted in the 2-, 3- or 4-position by hydroxy or $C_{1-4}$-alkoxy, and $W_2$ is hydrogen chloro, methyl, methoxy or carboxy, and $R_{15}$ is $C_{1-8}$alkyl, $C_{6-9}$cycloalkyl, cyclohexyl substituted by 1, 2 or 3 methyl groups,

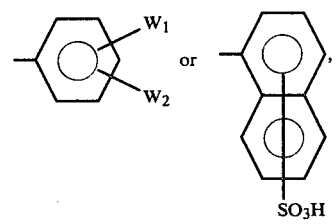

wherein $W_1$ and $W_2$ are as defined above.

48. The 1:2 metal complex according to claim 47 having the formula

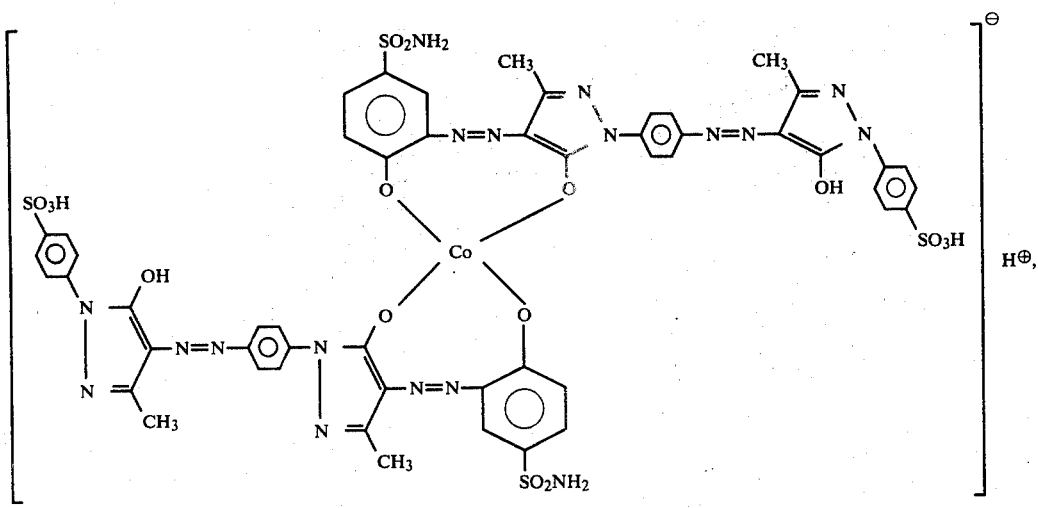
or a salt thereof each cation of which is non-chromophoric.
49. The 1:2 metal complex according to claim 48 in sodium salt form.
50. The 1:2 metal complex according to claim 47 having the formula
or a salt thereof each cation of which is non-chromophoric.
51. The 1:2 metal complex according to claim 50 in sodium salt form.
52. The 1:2 metal complex according to claim 47 having the formula
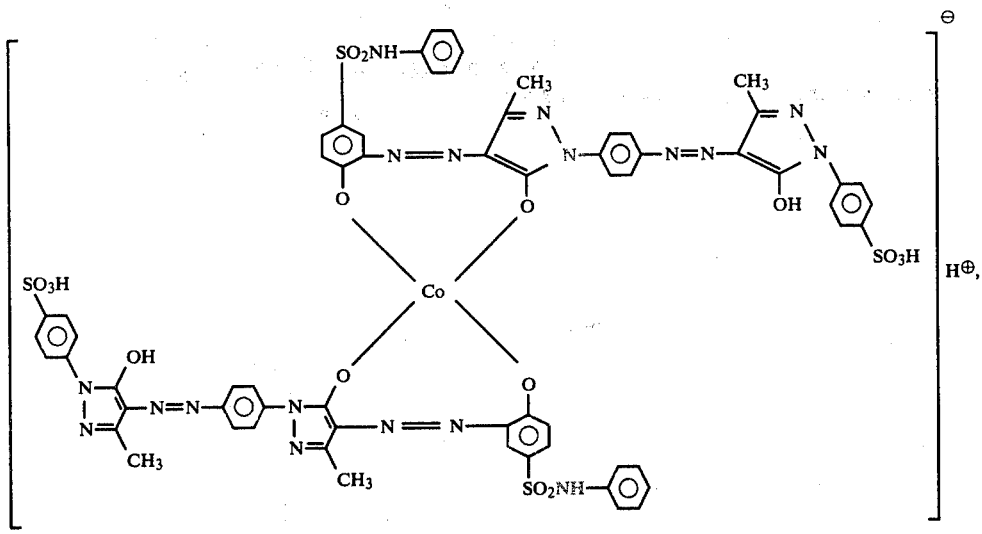

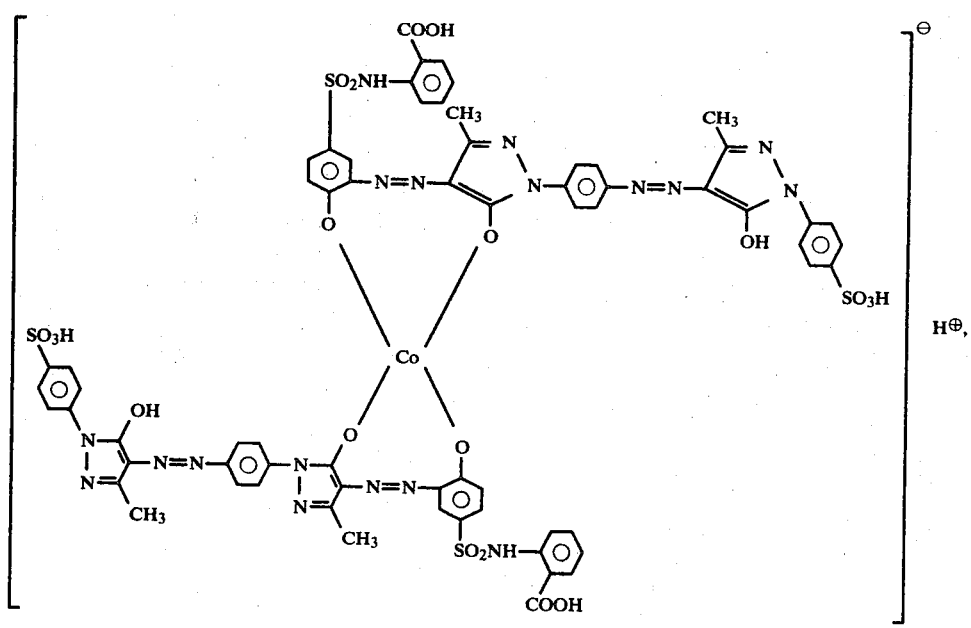
or a salt thereof each cation of which is non-chromophoric.
53. The 1:2 metal complex according to claim 52 in sodium salt form.
54. The 1:2 metal complex according to claim 47 having the formula
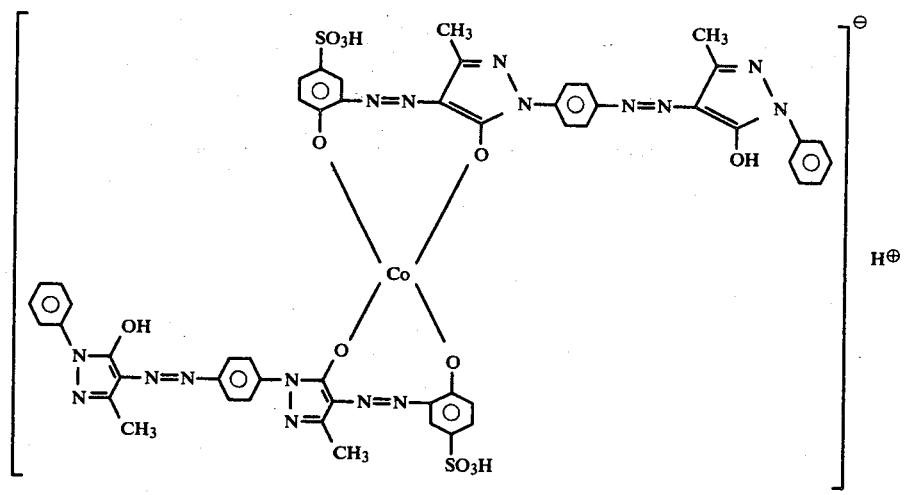
or a salt thereof each cation of which is non-chromophoric.
* * * * *